(No Model.)
W. W. WHITCOMB.
BRAKE SHOE.
No. 490,701.  Patented Jan. 31, 1893.
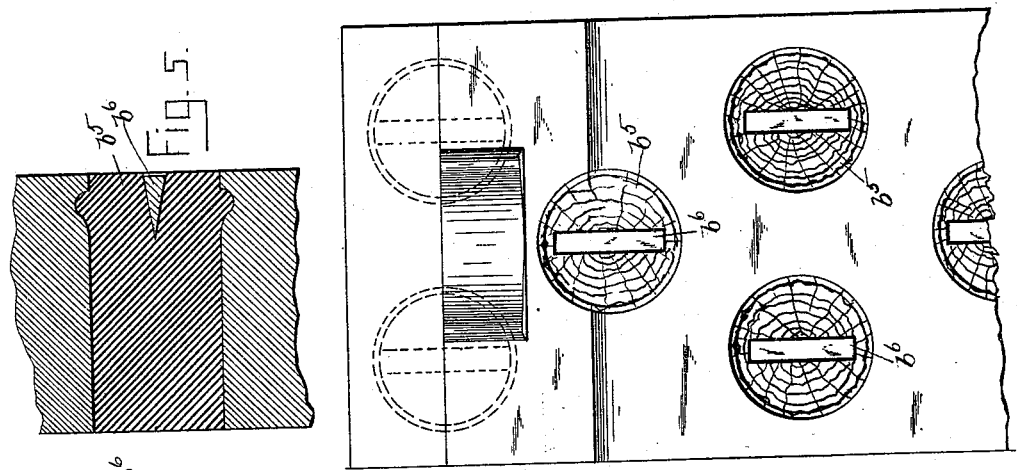
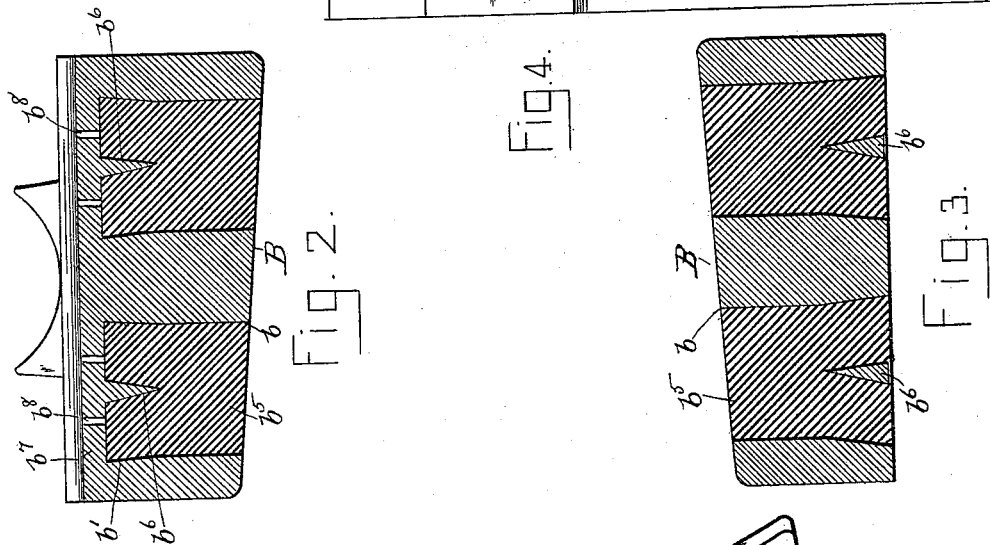
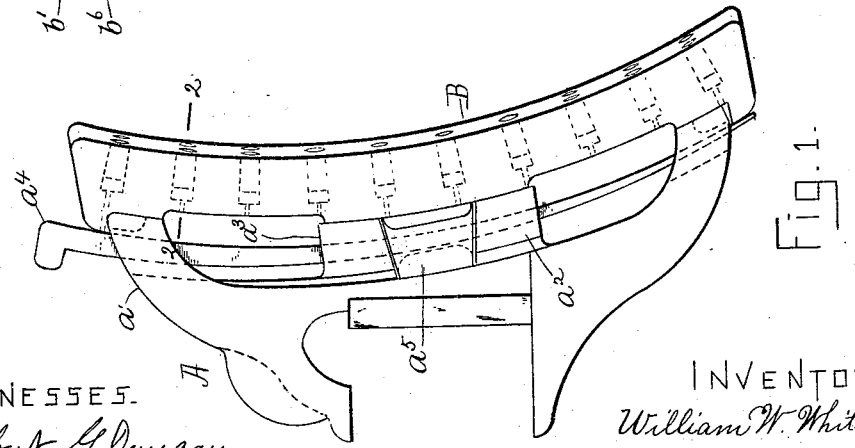
WITNESSES.
Albert G. Duncan.
J. Murphy.
INVENTOR.
William W. Whitcomb
By Jas. H. Churchill
ATT'Y

UNITED STATES PATENT OFFICE.

WILLIAM W. WHITCOMB, OF BOSTON, MASSACHUSETTS.

BRAKE-SHOE.

SPECIFICATION forming part of Letters Patent No. 490,701, dated January 31, 1893.

Application filed November 22, 1892. Serial No. 452,800. (No model.)

*To all whom it may concern:*

Be it known that I, WILLIAM W. WHITCOMB, of Boston, county of Suffolk, and State of Massachusetts, have invented an Improvement in Composite Brake-Shoes, of which the following description, in connection with the accompanying drawings, is a specification, like letters on the drawings representing like parts.

This invention relates to a clutch or brake-shoe, especially adapted among other things, to be used on railway cars. The brake-shoe referred to, has its wearing surface composed of metallic and preferably non-metallic portions, and which may be cast or wrought iron or steel, as desired, and wooden or other non-metallic compact masses, preferably in the form of plugs, which are fitted into sockets or holes in the said metallic portion.

My present invention has for its object to provide a brake-shoe, having a composite wearing surface of metallic and preferably non-metallic substances of such construction as to render it especially applicable to brake-heads commonly in use, and more particularly to the master car builders' brake-head, and to replace, when worn, the metal shoe now used with such heads.

In accordance with my invention, the brake-shoe is provided with, preferably, a series of holes or sockets, which may extend through or partially through the said shoe, and into which the solid preferably non-metallic portions, preferably wooden plugs, are inserted, and firmly secured therein by means of a locking device or key, preferably wedge-shaped, which is, for the best results, embedded in the rear end of the wooden or other solid non-metallic plug, and which firmly secures the said plug in its socket or hole against displacement by shrinkage, jar, or like causes. The locking device referred to, is preferably cast integral with the metallic portion of the brake-shoe and, for the best results, the rear portion of the hole or socket is enlarged, so that, when the wooden plug is driven into the socket, the said plug is split or distended at its rear end to fill the enlargement of the said socket, thereby preventing the said plug from working forward out of its socket, when in practical operation.

The particular features in which my invention consists will be pointed out in the claims at the end of this specification.

Figure 1, is a side elevation of a master car builder's brake-head, provided with a brake-shoe embodying my invention. Fig. 2, a section on the line 2—2, Fig. 1. Fig. 3, a section of a modified form of brake-shoe, the section being taken on the line 3—3, Fig. 4. Fig. 4, a rear side elevation of the modification shown in Fig. 3, and Fig. 5, a modification to be referred to.

The brake-head A, provided with the arms $a$ $a'$ and lugs or ears $a^2$ $a^3$, is and may be of any usual well-known construction and more particularly the construction known as the master car builders' brake-head. The brake-head A has secured to it, as by a spline $a^4$, a brake-shoe B preferably made as shown in Figs. 1 and 2, and consisting of a solid portion of metal, preferably cast iron, having on its back a lug or ear $a^5$ fitted between the lugs or ears $a^2$ $a^3$ and secured thereto by the spline $a^4$. The brake-shoe B is provided preferably with a number of holes or sockets $b$, preferably enlarged at their rear ends, as at $b'$, and which, as shown in Figs. 1 and 2, extend but partially through the shoe. The sockets or holes $b$ have inserted into them a mass of solid material, preferably non-metallic and preferably wooden plugs $b^5$, which, for the best results, are made to fit the said sockets substantially tight, and require being driven into the said sockets. The non-metallic or wooden plugs, are firmly secured in their sockets or holes by locking devices or keys, preferably wedges $b^6$ which may be cast integral with the metallic portion of the brake-shoe or which may be separate therefrom, and first slightly driven into the wooden plug and thereafter, farther driven into the said plug when the latter is driven into its socket. The wedges $b^6$ act to spread the rear end of the plug and fill the enlarged rear portion of the sockets or holes, thereby firmly securing the said plug in its socket against detachment by shrinkage, jar, &c. The wooden plugs are made of such length that when driven home in their sockets, their front ends are substantially flush with the face of the metallic portion of the shoe. I prefer to construct the shoe as shown in Figs. 1 and 2, with the holes or sockets extended but partially through the metallic portion of the shoe, and the solid portion $b^7$ of the shoe is preferably provided with a series of small holes or grooves or channels $b^8$, to form heat current interrupting passages by which the continuity of the current of heat in the solid rear metallic portion of the shoe is broken up, thereby obviating the deleterious effects produced by the over-heating of the brake-shoes.

I do not desire to limit my invention to the precise construction shown in Figs. 1 and 2, as some or all of the said holes or openings may be extended entirely through the metallic portion of the shoe.

In Fig. 4, some of the holes or sockets are represented as extended entirely through the metal, and the plugs are secured by independent wedges or keys, and some are represented by dotted lines as extended but partially through the metal, after the manner shown in Fig. 1. If desired the enlargement of the socket or hole may be of any desired shape, as for instance, as shown in Fig. 5, wherein the enlargement is made as an annular channel or groove $c$ into which the non-metallic plug is forced by the wedge or key. So also, I do not desire to limit my invention to any particular form of key or locking device by which the plug is firmly secured in its socket or hole.

The gist of my present invention consists of the key or locking device and consequently, while I prefer to make the plugs $b^5$ of non-metallic material, I do not desire to limit my invention in this respect as the said plugs may be made of a composition of metals or a metal which is softer than the main metallic portion of the shoe, and this softer metal may be cast into the sockets or holes about the locking device or key which will act to retain or lock the soft metal plug in its socket.

I claim—

1. A composite brake-shoe, consisting of a metallic portion having one or more sockets or holes, non-metallic portions inserted into said holes or sockets, and a locking device or key to firmly secure the said non-metallic portion in its socket, substantially as described.

2. A composite brake-shoe, consisting of a metallic portion having one or more sockets or holes, non-metallic portions inserted into said holes or sockets, and a locking device or key embedded in the said non-metallic portion to firmly secure the same to the metallic portion, substantially as described.

3. The hereindescribed composite brake-shoe, consisting of a metallic portion having a solid rear portion and provided with one or more sockets or holes extended from the front face of the shoe toward the solid rear portion, non-metallic plugs inserted into said holes or sockets, and a key or device to lock the said plug in its socket, substantially as described.

4. The hereindescribed composite brake-shoe, consisting of a metallic portion having one or more sockets enlarged at their rear ends, non-metallic plugs inserted therein and a key or locking device to distend the rear end of the non-metallic plug into the enlargement of the socket or hole, substantially as described.

5. A composite brake-shoe consisting of a metallic portion having one or more holes or sockets, one or more plugs of a softer material inserted into said sockets, and a locking device or key to firmly secure the plug in its socket, substantially as described.

In testimony whereof I have signed my name to this specification in the presence of two subscribing witnesses.

WILLIAM W. WHITCOMB.

Witnesses:
JAS. H. CHURCHILL,
J. MURPHY.